(12) United States Patent
Ishikawa et al.

(10) Patent No.: US 8,849,521 B2
(45) Date of Patent: Sep. 30, 2014

(54) TRACTOR

(75) Inventors: Shinnosuke Ishikawa, Sakai (JP); Eiji Nishi, Kawachinagano (JP); Nobuyuki Okabe, Izumi (JP); Kenichiro Yagi, Yao (JP)

(73) Assignee: Kubota Corporation, Osaka (JP)

( * ) Notice: Subject to any disclaimer, the term of this patent is extended or adjusted under 35 U.S.C. 154(b) by 42 days.

(21) Appl. No.: 13/407,374

(22) Filed: Feb. 28, 2012

(65) Prior Publication Data

US 2012/0239260 A1 Sep. 20, 2012

(30) Foreign Application Priority Data

Mar. 15, 2011 (JP) ................. 2011-056248

(51) Int. Cl.
*A01B 63/114* (2006.01)
*A01B 63/112* (2006.01)

(52) U.S. Cl.
CPC .......... *A01B 63/112* (2013.01); *A01B 63/1145* (2013.01)
USPC ............................................. 701/50; 701/1

(58) Field of Classification Search
USPC ...................................................... 701/1, 50
See application file for complete search history.

(56) References Cited

U.S. PATENT DOCUMENTS

| 3,686,935 | A | * | 8/1972 | May ........................... 73/114.13 |
| 3,913,680 | A | | 10/1975 | Carlson |
| 5,291,407 | A | * | 3/1994 | Young et al. .................... 701/50 |
| 5,911,769 | A | * | 6/1999 | Orbach et al. ................... 701/50 |
| 6,195,604 | B1 | * | 2/2001 | Moore et al. .................... 701/50 |
| 6,216,072 | B1 | * | 4/2001 | Boe et al. ........................ 701/50 |
| 6,823,249 | B2 | * | 11/2004 | Moore et al. .................... 701/50 |
| 2001/0001844 | A1 | * | 5/2001 | Moore et al. .................... 701/50 |
| 2013/0289832 | A1 | * | 10/2013 | Pirotais ........................... 701/50 |

FOREIGN PATENT DOCUMENTS

| DE | 19945853 A1 | 3/2001 |
| JP | 5137406 A | 6/1993 |
| JP | 2010193764 A | 9/2010 |

* cited by examiner

*Primary Examiner* — Ian Jen
(74) *Attorney, Agent, or Firm* — The Webb Law Firm

(57) ABSTRACT

Provided is a tractor which allows continuation of a plowing work by appropriately elevating a plow when slip occurs in wheels. The tractor includes draft controlling means (34) for elevating the plow to a target machine body level value obtained by making reference to control information with a draft load value detected by a draft load sensor (S). The control information is set based on a target plowing depth set when the plow was set to a target plowing depth and a draft load value. When a slip ratio detected by a slip ratio acquiring means (37) exceeds a threshold value, in place of previously set control information, there is newly set control information which renders higher the target machine body level relative to a same draft load value, thereby to elevate the plow.

4 Claims, 5 Drawing Sheets

TRACTOR

BACKGROUND OF THE INVENTION

1. Field of the Invention

The present invention relates to a tractor having draft controlling means configured to execute a draft control of a ground work implement during a work by this ground work implement liftably mounted to a traveling machine body which travels by a traveling apparatus, the draft control being executed based on the draft load value detected by a draft load sensor.

2. Description of the Related Art

In the Japanese Unexamined Patent Application Publication No. 5-137406 (JP 5-137406 A) having the above-described arrangement, there is described a construction as follows. Namely, a detecting means is provided for detecting respective rotations of right and left front wheels of a four-wheel drive type tractor. From detection results of this detecting means and based on a rotational speed difference between the right and left wheels (a slip ratio), a slip calculation value is obtained. In order to keep this slip calculation value below a set value, there is provided a forcible elevation controlling means for causing a plow work implement to move up, with priority over the draft control, when this slip calculation value exceeds the set value.

According to JP 5-137406 A, when the draft load of the plow work implement is large, there is exerted a moment toward the front rising side of the machine body, so that a slip tends to occur with reduction in the ground contact load of the front wheels, which slip causes in turn a rotational speed difference between the right and left front wheels. Then, upon recognition of occurrence of slip due to this rotational speed difference, the work implement is forcibly elevated, thereby to reduce the draft load, so that occurrence of slip can be restricted.

Further, in the arrangement disclosed in the U.S. Pat. No. 3,913,680, based on a rotational speed difference between a freely rotated wheel and a drive wheel, a slip ratio is obtained. And, during a draft control, in order to keep the slip ratio at a predetermined value, a solenoid valve is controlled to lift up/down the implement.

When a ground work implement providing a large draft load such as a plow is employed and a plowing work is effected with a draft control, there is executed a control wherein as the plow is elevated in association with increase in the draft load, increase of the draft load is restricted and the plow is lowered in association with decrease in the draft load.

However, if slip occurs in a wheel when this wheel is receiving a draft load from the plow, there occurs reduction in the draft load, so that a control operation for lowering the plow may be executed inadvertently. Hence, there may occur a situation when the plowing work cannot be continued since the slip is not solved. When such situation as this not allowing continuation of the plowing work has developed, the worker can easily recognize this. However, there may occur a phenomenon of the wheel slipping for a short period in repetition during traveling. In such case like this, the working efficiency may sometimes deteriorate as the worker continues to fail to recognize the occurrence of slip.

To cope with such inconvenience as above, it is conceivable to effect a control operation of forcibly elevating the ground work implement based on wheel slip, as described in JP 5-137406 A and U.S. Pat. No. 3,913,680. As such control mode for forcibly lifting up or elevating the ground work implement, it is conceivable for example to provide a hydraulic cylinder for lifting up/down the ground work implement and a control valve for effecting feeding/discharging of working oil to/from this hydraulic cylinder, so that when the slip ratio is below a threshold value, the control valve is operated based on the draft load for draft control, whereas when the slip ratio exceeds the threshold value, the greater the value exceeding the threshold value, the greater the opening ratio of the control value, for operating the hydraulic cylinder for its rising direction. However, with such mode of control, in case the slip ratio has exceeded the threshold value significantly, as the large opening ratio is set for the control value, the hydraulic cylinder will be operated in the rising direction at a high speed, whereby the slip will be solved in a short period time in association with high speed rising movement of the ground work implement. Nevertheless, as no rising target is set for the ground work implement, the ground work implement will be elevated more than necessary and it will take time until the implement returns to the target plowing depth after this rising movement, so that a condition of excessively shallow plowing depth may continue for some time disadvantageously. In this respect, there remains room for improvement.

The object of the present invention is to reasonably construct a tractor capable of causing the ground work implement to rise up in the event of slip of traveling apparatus to allow continuation of the ground work.

SUMMARY OF THE INVENTION

The above object is fulfilled according to a first aspect of the invention as under:—

A tractor including a ground work implement liftably mounted to a traveling machine body which is caused to travel with a traveling apparatus, the tractor comprising:

a draft load sensor for detecting a draft load value during a work by the ground work implement;

draft controlling means for executing lifting up/down control of the ground work implement based on the draft load value detected by the draft load sensor;

slip ratio acquiring means for acquiring a slip ratio of the traveling apparatus relative to the ground surface; and control information changing means;

wherein during a draft control by the draft controlling means, the draft controlling means obtains a target machine body level value by referring to control information with the draft load value detected by the draft load sensor, and the lifting up/down control of the ground work implement is executed so as to achieve agreement between said target machine body level value and a machine body level value detected by a level sensor; and when the slip ratio acquired by the slip ratio acquiring means exceeds a threshold value, said control information changing means newly sets control information which renders higher the target machine body value relative to a same draft load value, in place of the control information which has been set already during the draft control, or said control information changing means enhances control sensitivity of the control information which has been set already during the draft control.

With the above-described construction, at the time of draft control, with reference to the control information with a draft load value detected by the draft load sensor, there is obtained a target machine body value for the ground work implement, and based on change in the draft load value, the lifting up/down control of the ground work implement is executed. In the course of this execution of the draft control, if the slip ratio acquired by the slip ratio acquiring means exceeds a threshold value, the control information changing means newly sets control information which renders higher the target machine body value relative to the draft load value of a same value, in place of the control information which has been set already during the draft control or enhances the control sensitivity of the control information which has been set already during the draft control.

And, in the case of control information being newly set, this newly set control information renders higher the target machine body value relative to a same draft load value. Accordingly, the ground work implement will be elevated to the target machine body level indicated by this control information. Further, in the case of enhancing the sensitivity of the control information, it becomes not only possible to elevate the ground work implement in a reliable manner even in the event of only small change in the draft load value, but also possible to elevate the ground work implement to the higher target machine body level indicated by the control information. In this way, even with either new setting of the control information or enhancement of the control sensitivity of the existing control information, the target machine body level will be obtained with reference to the control information with the draft load value. Therefore, there will occur no elevation of the ground work implement beyond this target machine body level.

Therefore, when slip occurs in the traveling apparatus, the ground work implement will be elevated appropriately to control the slip and the plowing depth of the ground work implement will not become too shallow at the time of restriction of this slip. Consequently, the tractor can continue the ground work appropriately.

Preferably, according to another aspect of the invention, the tractor further comprises:

position controlling means for executing the lifting up/down control of the ground work implement so as to achieve agreement between a set value of a position setter for setting a machine body level of the ground work implement and a machine body level value detected by a lift arm sensor for detecting the machine body level of the ground work implement; and control information setting means for setting the control information based on the set value of the position setter when the ground work implement is set to a target underground machine level by a manual operation of the position setter, during the draft control.

With the above-described construction, when the ground work implement is set to a target machine body level by an operation of the position setter, the control information setting means sets control information, based on the set value of the position setter. Namely, even if the ground work implement is lowered to any desired underground target machine body level (target plowing depth), draft control will be executed based on control information which is set in correspondence with this machine body level.

Preferably, according to still another aspect of the invention:

the control information has a data structure capable of displaying relationship between the draft load value and the machine body level value as linear information;

there is provided a sensitivity setting controller for manually changing gradient of the control information set by the control information setting means; and when the control sensitivity of the control information is to be enhanced by the control information changing means, the gradient of the control information is set to a higher sensitivity side, in place of the setting by the sensitivity setting controller.

With the above-described construction, changing of sensitivity of the draft control is possible by an operation of the sensitivity setting controller; and also when the control sensitivity is to be changed by the control information changing means, in place of setting made by the setting dial, the gradient of the control information which can be displayed as linear information is changed to the higher sensitivity side. Hence, it is possible to increase the target machine body level during the draft control, simultaneously with enhancement of the control sensitivity. That is, when the sensitivity of the draft control is set high, even if the fluctuation range for the draft load value is fixed, the range of the elevation/lowering of the ground work implement is extended, so that when the draft load value is increased, increase of the draft load can be restricted in a speedy manner, by significantly lifting up the ground work implement.

Preferably, according to still yet another aspect of the invention, the slip ratio acquiring means effects an operation of acquiring the slip ratio by comparing an actual traveling speed of the traveling machine body detected by continuous reception of signals from a GPS satellite and a driving speed based on the driving speed of the traveling apparatus.

With the above-described construction, an actual traveling speed of the traveling machine body is detected by continuous reception of signals from a GPS satellite and a driving speed of the traveling apparatus such as a wheel is detected. And, by comparing these with each other, a slip ratio is acquired. Therefore, a highly accurate slip ratio can be acquired even without any special sensor or the like for determining the relative speed between the traveling machine body and the ground surface.

DETAILED DESCRIPTION OF PREFERRED EMBODIMENTS

An embodiment of the present invention will be described next with reference to the accompanying drawings.
[General Construction]

Figure 1:
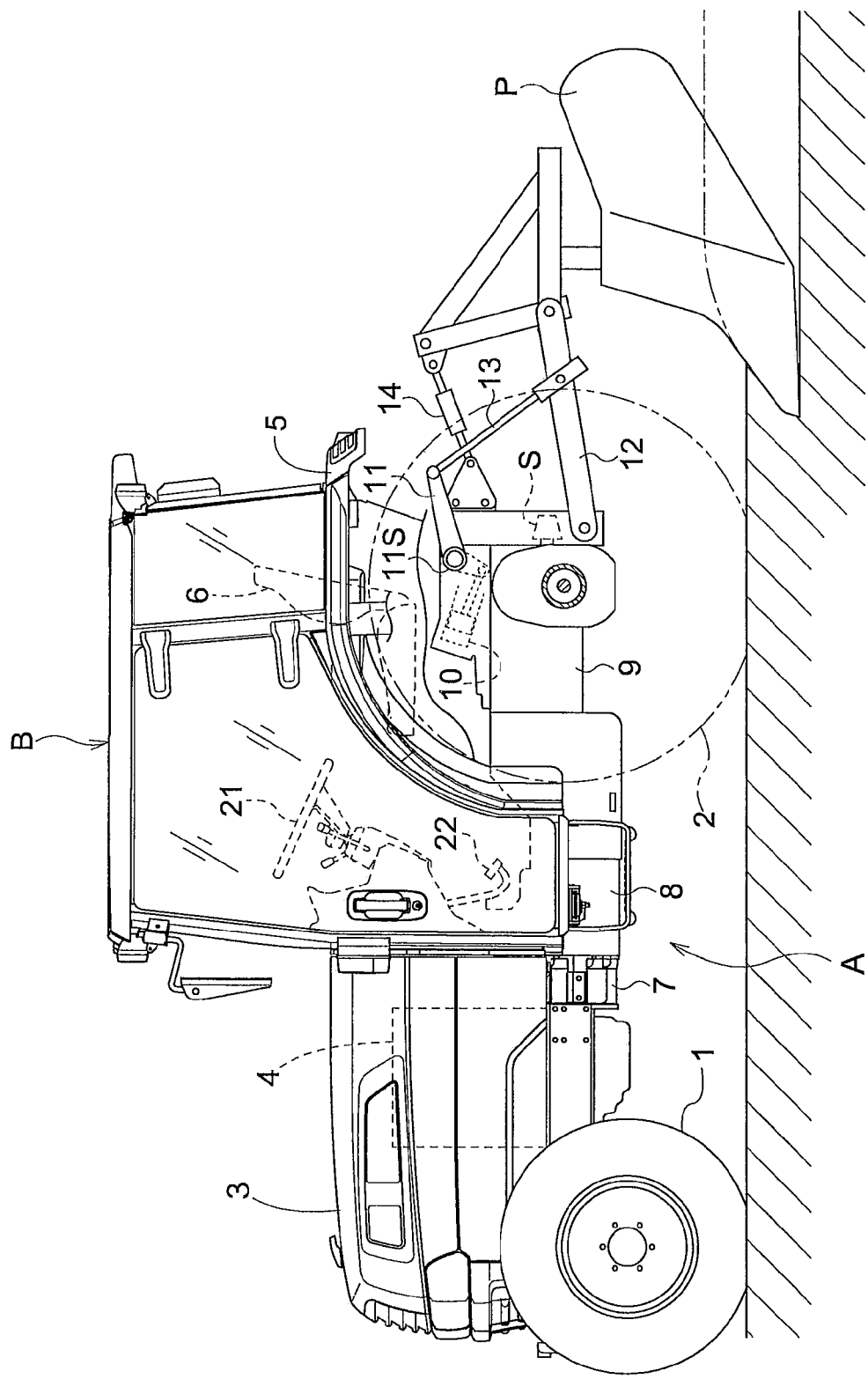
FIG. 1 is an overall side view of a tractor under a plowing work.

As shown in FIG. 1, a traveling machine body A mounts, as traveling apparatuses, a pair of right and left front wheels 1 and a pair of right and left rear wheels 2. An engine 4 is mounted inside an engine hood 3 provided at a front portion of the traveling machine body A. A driver's set 6 is disposed at an intermediate position between right and left rear wheel fenders 5. A cabin B is provided to surround the driver's seat 6. These components together constitute a tractor. In particular, the front wheels 1 and the rear wheels 2 will be generically referred to as wheels. Incidentally, in this tractor, one or both of the front wheels 1 and the rear wheels 2 may be constituted from crawler traveling apparatuses.

In this tractor, a clutch housing 7, a center frame 8 and a transmission case 9 are connected to the rear side of the engine 4 in this mentioned order. The transmission case 9 is disposed downwardly of the driver's seat 6. Further, the traveling machine body A includes a transmission line for transmitting a drive power from the transmission case 9 to the right and left front wheels 1 and the right and left rear wheels 2. With these arrangements, the tractor is constructed as a four-wheel drive type tractor.

At an upper position of the transmission case 9, there is provided a hydraulic type lift cylinder 10 as a lifting up/down (elevating/lowering) actuator. And, at a rear rend of this transmission case 9, there are provided a pair of right and left lift arms 11 which are vertically pivotable by an operation of the lift cylinder 10.

In the same figure, there is shown an arrangement of a plow P as a "ground work implement" being connected to the rear end of the traveling machine body a via a three-point link mechanism. The three-point link mechanism includes a pair of right and left lower links 12 pivotally connected to rear end lower portions of the transmission case 9, a single top link 14 disposed upwardly thereof, and a pair of right and left lift rods 13 that support the right and left lower links 12 to the pivotal ends of the lift arms 13 in a suspended manner. With this construction in operation, with upward pivotal movements of the lift arms 11, the plow P is lifted up via the three-point link mechanism. Conversely, with downward pivotal movements of the lift arms 11, the plow P is lowered via the three-point link mechanism. Meanwhile, as the lift cylinder 10, there is employed a single-action type, so that a driving force is applied for elevating the plow P, but for lowering the plow P, the plow P is lowered by its own weight.

To lower ends of the right and left lower links 12, there is connected a shaft member (not shown) formed of a steel member under a transverse posture. This shaft member is elastically deformed when the lower links 12 are displaced rearwards in association with application of a draft (traction) load to the plow P. And, for detecting a draft load value from the amount of this elastic deformation of the shaft member, a draft load sensor S comprised of a strain gauge, a differential transformer or the like is provided in the transmission case 9. During a draft control to be described later, a control operation is effected for lifting up/down the plow P, based on a draft load value detected by this draft load sensor S.

Figure 2:
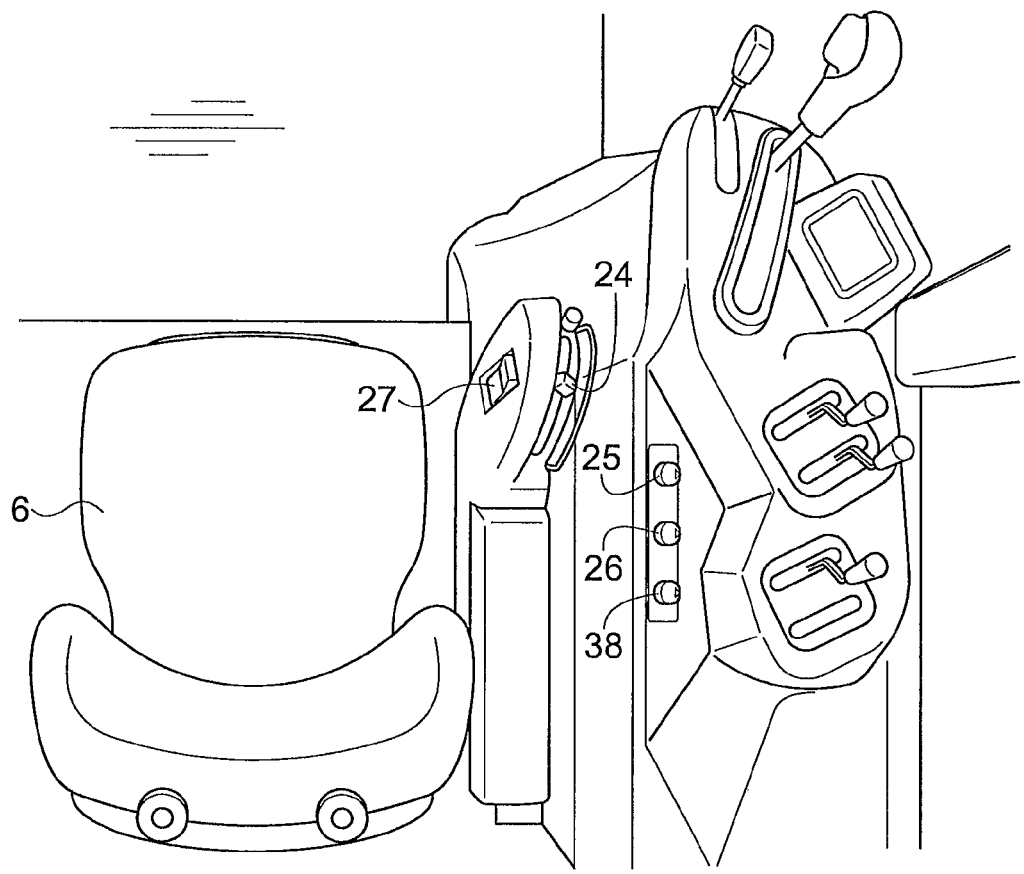
FIG. 2 is a plan view showing layout of a position lever, etc.

The cabin B has a standard construction including: a front glass shield at its front portion: doors which can be opened to the right and left sides thereof, the doors being formed of transparent glass or transparent resin; and a roof at the upper portion thereof. At a forward position of the driver's seat 6, there is provided a steering wheel 21 for effecting steering operations (steering). And, at positions downwardly of this steering wheel 21, there are arranged a clutch pedal 22 and a brake pedal (not shown). As shown in FIG. 2, in a control panel provided on the right end portion of the driver's seat 6, there is provided a position lever 24 for effecting lifting control of the work implement such as the plow P; and there are also provided a mode switching dial 25 for selecting either a position control mode or a draft control mode; a draft ratio setting dial 26 (an example of "sensitivity setting controller") for setting the sensitivity of the lift control during the draft control; a forcible lift switch 27 for effecting forcible lifting up/down of the work implement such as the plow P; and a slip control switching switch 38. Incidentally, the forcible lift switch 27 realizes, with an operation thereof to the upper side, an elevating control for elevating the plow P to a preset machine body level during the draft control and realizes also, with an operation thereof to the lower side, a control for returning to the draft control by allowing the plow P to be lowered from this elevated condition.

This tractor includes a control system configured as follows. Namely, during a draft work, if slip occurs in the front wheels 1 and the rear wheels 2, the ratio of this slip is acquired. And, if this slip ratio is found to exceed a preset threshold value, the plow P is forcibly elevated (lifted up) to alleviate the draft load. This control system will be detailed next.

[Control Construction]

Figure 3:
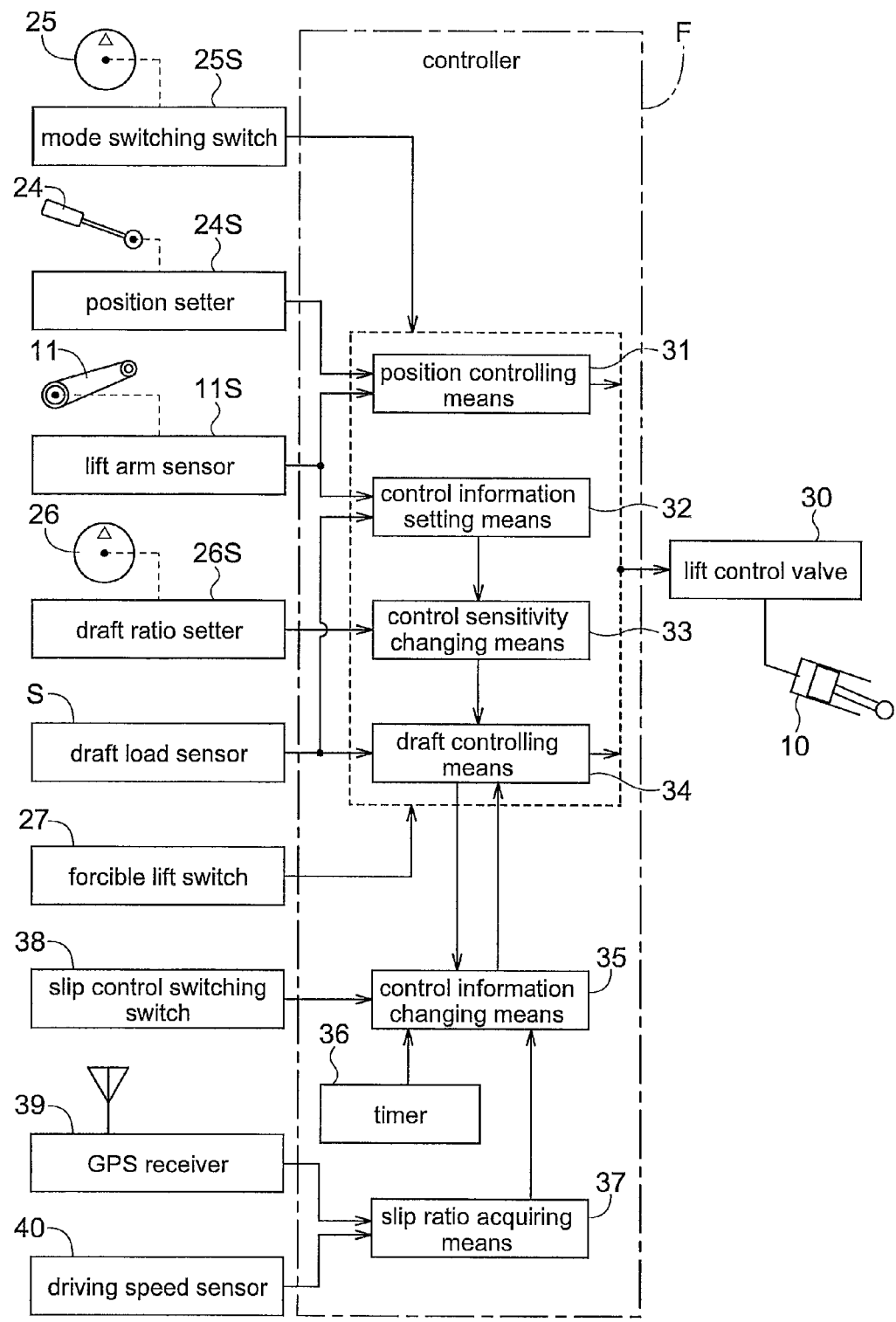
FIG. 3 is a block circuit diagram showing a control system.

As shown in FIG. 3, the lift cylinder 10 is configured such that an amount of working oil is fed/discharged to/from the cylinder 10 by means of an electromagnetic type lift control valve 30. At the base end position of each lift arm 11, there is provided a lift arm sensor 11S (an example of a level sensor for detecting a machine body level of the plow P) for detecting a pivotal angle of the lift arm 11 associated therewith.

The traveling machine body A includes a controller F for controlling the lift control valve 30. This controller F includes a digital processing line such as a microprocessor, a DSP (digital signal processor), etc.; and also includes position controlling means 31, control information setting means 32, control sensitivity changing means 33, draft controlling means 34, control information changing means 35, a timer 36 and slip ratio acquiring means 37.

The position controlling means 31 realizes a position control for lifting the work implement such as the plow P to a position corresponding to the operated position of the position lever 24. The control information setting means 32 sets control information G (see FIG. 5) corresponding to the operated position of the position lever 24 and effects a processing for setting the gradient (sensitivity) of this control information G based on a signal from a draft ratio setter 26S. The control sensitivity changing means 33 realizes a control for setting control sensitivity of the control information G based on the information from the draft ratio setter 26S. The draft controlling means 34 realizes a draft control for controlling the level of the plow P based on the draft load value detected by the draft load sensor S and on the control information S. The control information changing means 35 realizes changing of the control information G during the draft control. The timer 36 provides time information to the control information changing means 35. The slip ratio acquiring means 37 acquires a slip ratio, based on a driving speed of the traveling driving line and the moving speed of the machine body A which is acquired externally.

The above components, i.e. the position controlling means 31, the control information setting means 32, the control sensitivity changing means 33, the draft controlling means 34, the control information changing means 35 and the slip ratio acquiring means 37 are comprised of software. However, alternatively, these may be constructed of hardware or combination of hardware and software.

The controller F receives signals from a mode switching switch 25S operated by the mode switching dial 25, a position setter 24S for detecting an operated position of the position lever 24, the lift arm sensor 11S, a draft ratio setter 26S operated by the draft ratio setting dial 26, a draft load sensor S, the forcible lift switch 27, the slip control switching switch 38 for effecting switchover between execution of a slip control and stop of the stop control, a GPS receiver 39 for receiving radiowave signals from a GPS (Global Positioning System) satellite for determining a traveling speed of the traveling machine body A, and a driving speed sensor 40 for acquiring a traveling driving speed of the driving line (e.g. a transmission shaft for driving the front wheels 1, a transmission shaft for driving the rear wheels 2, etc.) for driving the front wheels 1 and the rear wheels 2 of the traveling machine body A. Also, this controller F outputs control signals to the lift control valve 30.

This controller F realizes selection between a position control and a draft control, in response to an operation on the mode switching dial 25. The controller F realizes also selection between a control for effecting change of the control information G based on a slip ratio and a control for not effecting the same, in response to an operation on the slip control switching switch 38.

[General Description of Position Control]

In the position control, when the position lever 24 is operated by an operator, the position controlling means 31 sets a target machine body level value for the working implement, based on a signal from the position setter 24S. Further, the lift control valve 30 is controlled so as to operate the lift arm 11 to a direction for achieving agreement between this target machine body level value and a lift arm angle (a machine body level of the working implement) detected by the lift arm sensor 11S. With this position control, there is realized a control for lifting (elevating/lowering) the working implement such as the plow P to a machine body level corresponding to the operated position of the position lever 24.

[Draft Control]

Figure 4:
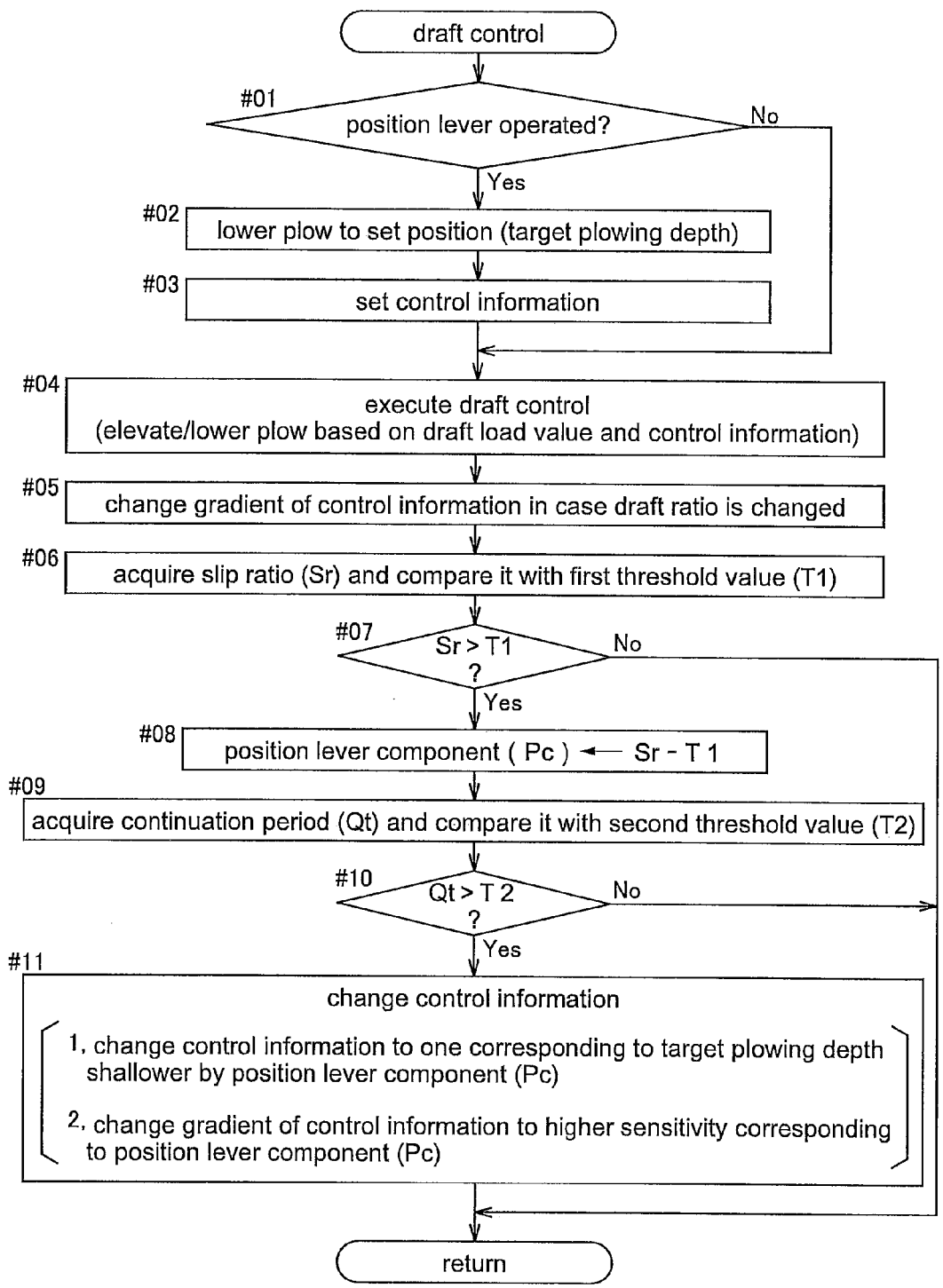
FIG. 4 is a flowchart of a draft control.
Figure 5:
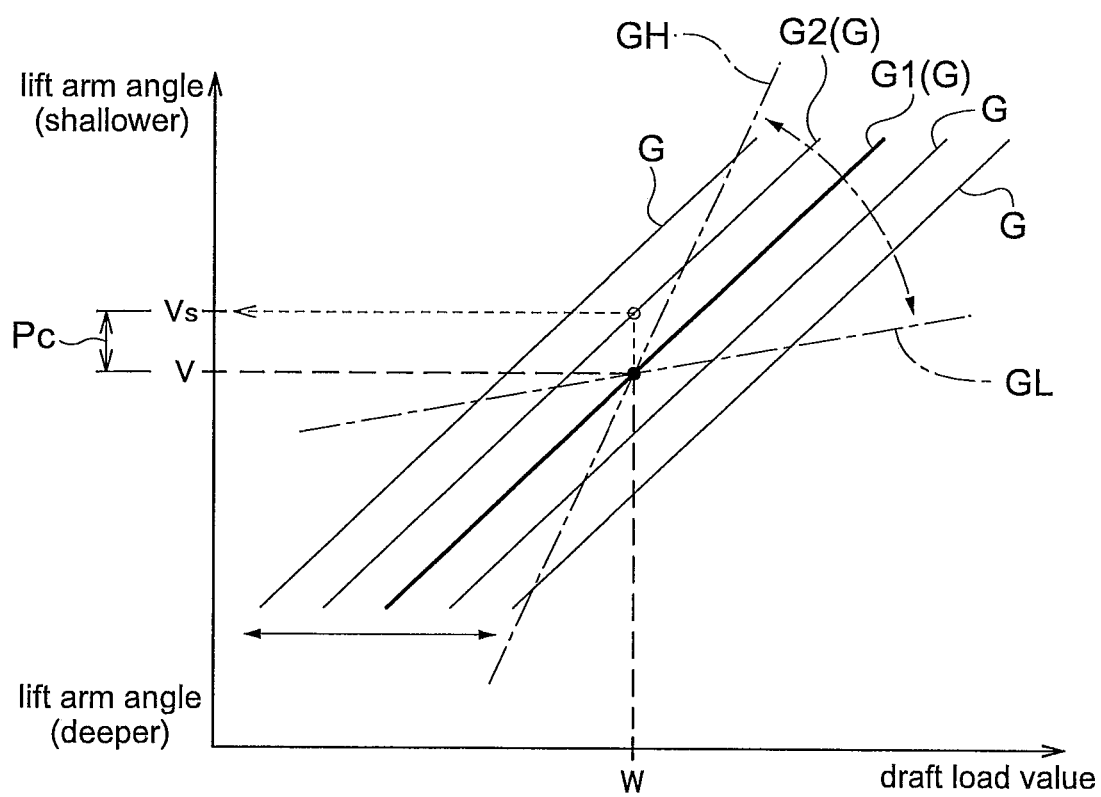
FIG. 5 is a graph showing control characteristics information.

The draft control, as illustrated by the flowchart in FIG. 4, is realized by setting the plow P to the target machine body level (an underground machine body level, a target plowing depth) by the operator's operation on the position lever 24. That is, when the draft control is to be initiated, with the draft control being selected by the mode switching dial 25, the position lever 24 is operated to lower the plow P. In response to this operation, a signal of the position setter 24S and a setting signal of the draft ratio setter 26s are acquired by the controller F, and based on these signals, the control information setting means 32 sets control information G (G1) as shown in FIG. 5 (steps #01 through #03 in FIG. 4). When the control information G is set in this way, if the signal of the position setter 24S indicates a shallow target machine body level, the shallower the level, the upper control information G is set, and the greater the draft ratio of the draft ratio setter 26S, the steeper gradient control information G is set.

As shown in FIG. 5, the control information G has a data structure capable of displaying the relationships between the draft load values and the lift arm angles (machine body level value) as straight linear information. And, the control information setting means 32 is capable of setting any one of the plurality of control information G. For realizing this setting, the control information setting means 32 is provided with a mode of processing such that one control information G may be generated by a calculation. As an example of this processing, one control information G may be selected from the plurality of control information G stored in a storage or the like, based upon the target machine body level (a target plowing depth) and the setting signal of the draft ratio setter 26S.

Next, upon setting of the control information G, the draft controlling means 34 executes a draft control. In this draft control, reference is made to the control information G with the draft load value detected by the draft load sensor S, thereby to obtain a lift arm angle (a target machine body level). Then, the lift control valve 30 is operated to a direction for achieving agreement between this target lift arm angle and a value of the lift arm angle detected by the lift arm sensor 11S. And, with an operation of the lift cylinder 10, lift control of the plow P is executed (step #04)

During the draft control, in contrast to the conventionally practiced simple control wherein a draft load value detected by the draft load sensor S is maintained to a target value, as shown in FIG. 5, a target lift arm angle V (target machine body level value) is obtained by making reference to (i.e. looking up) the control information G with the draft load value W detected by the draft load sensor S, and a control operation similar to the position control will be executed with this lift arm angle as the control target.

In particular, during the draft control, there is set an insensitivity range having a predetermined value range, based on the draft load value W at the time of the setting of the control information G. Then, when the draft load value W detected by the draft load sensor S has exceeded an upper limit value of the insensitivity range, the plow P will be elevated to a target machine body level value (a lift arm angle) obtained by reference to the control information G with the draft load value. Conversely, when the draft load value W detected by the draft load sensor S has reached a value smaller than the lower limit value of the insensitivity range, the plow P will be lowered to the target machine body level value (the lift arm angle) obtained by reference to the control information G with the draft load value. The insensitivity range is provided for restricting the lift control of the plow P even in association with occurrence of an overshoot due to inertia at the time of elevating/lowering of the plow P or when the detection value of the draft load sensor S varies due to vibration of the traveling machine body A, thereby to converge the control. And, the width of this insensitivity range is set to a value of the necessary minimum.

In the course of execution of this draft control, if the upper side of the forcible lift switch 27 is operated, the plow P is elevated to a predetermined level to shift from the draft control to the forcible elevation control. Under this elevated state, if the lower side of the forcible lift switch 27 is operated, the forcible lift control is changed to the draft control, so that the plow P is lowered and can be returned to the plowing operation by the draft control. Incidentally, at the timing of transition from the forcible elevation control to the draft control, the detection value of the draft load sensor S is extremely small, so that a control operation is effected for forcibly lowering the plow P.

Further, in case the draft ratio setting dial 26 is operated at the time of execution of the draft control, this operation is detected by the draft ratio setter 26S and the gradient of the control information G displayed in the form of linear information is changed and with this change, the control sensitivity is changed (step #05 in FIG. 4).

The draft control can be understood as a control comprising mixture of the component of the position control and the conventionally practiced component of the draft control. If the draft ratio setting dial 26 is operated in the direction for increasing the ratio of the draft control, the control sensitivity changing means 33 sets high sensitivity control information GH having the steep gradient shown in FIG. 5. Conversely, if the draft ratio setting dial 26 is operated in the direction for decreasing the ratio of the draft control, the control sensitivity changing means 33 sets low sensitivity control information GL having the gentle (approaching the horizontal) gradient shown in FIG. 5. Incidentally, the high sensitivity control information GH and the low sensitivity control information GL shown in FIG. 5 are only typical examples. Each control sensitivity (gradient) can be set as desired by an operation on the draft ratio setting dial 26.

For the reasons described above, if the draft ratio setting dial 26 is operated in the direction for increasing the ratio of the draft control, the control sensitivity is enhanced so that a small change in the detection result (the draft load value W) of the draft load sensor S will appear as a large control amount, thereby to increase the amount of change in the target machine body level V (the target plowing depth). Conversely, if the draft ratio setting dial 26 is operated in the direction for decreasing the ratio of the draft control, the control sensitivity is reduced so that a change in the detection result (the draft load value W) of the draft load sensor S will appear as a small control amount, thereby to decrease the amount of change in the target machine body level V (the target plowing depth).

Next, the slip ratio acquiring means 37 acquires a slip ratio (Sr) and compares the slip ratio (Sr) with a first threshold value (T1). If the slip ratio (Sr) is found to exceed the first threshold value (T1), a position lever component (Pc) is set. Further, a continuation period (Qt) of the slip ratio (Sr) exceeding the first threshold value (T1) is acquired and the continuation period (Qt) is compared with a second threshold value (T2). If this comparison reveals that the continuation period (Qt) exceeds the second threshold value (T2), the control information G is changed based on the position lever component (Pc) (steps #06 through #11).

As described above, the control operation for changing the control information G is selected by the slip control switching switch 38. If a control mode for changing the control information G is selected, the control information G is changed based on the slip ratio. If such control mode is not selected, the control information G is not changed.

The operations of the steps #06 through #11 are effected by the control information changing means 35. In the operation of acquiring the slip ratio (Sr), the slip ratio acquiring means 37 acquires the slip ratio (Sr) by comparing and computing an actual traveling speed of the traveling machine body A obtained by the GPS receiver 39 and the driving speeds of the front wheels 1 and the rear wheels 2 acquired by the driving speed sensor 40, and compares the slip ratio (Sr) with the first threshold value (T1). If this comparison shows that the slip ratio (Sr) exceeds the first threshold value (T1), a value obtained by subtracting the first threshold value (T1) from the slip ratio (Sr) is obtained by the calculation as a position lever component (Pc).

Thereafter, the continuation period (Qt) of the slip ratio (Sr) exceeding the first threshold value (T1) is acquired from time information from the timer 36, and the continuation period (Qt) is compared with the second threshold value (T2). If this comparison shows the continuation period (Qt) exceeds the second threshold value (T2) (e.g. a short period of a few seconds), the control information changing means 35 changes the control information G.

In the operation wherein the slip ratio acquiring means 37 acquires a slip ratio (Sr) and compares it with the first threshold value (T1) (step #06), a subtraction is always effected. Therefore, the above-described operation for setting the position component (Pc) (step #08) may be effected simultaneously with this operation of step #06. Alternatively, this operation for setting the position component (Pc) (step #08) may be effected after the timing of determination if the continuation period (Qt) exceeds the second threshold value (T2) (step #09).

Incidentally, the first and second threshold values need not necessarily be fixed values, but can be any desired values. Further, it is possible to configure such that these first and second threshold values may be changed and set as desired by an operator by a manual setter. In this case, two manual setters may be provided for individual setting/changing of both the first and second threshold values. Or, only manual setter may be provided for allowing setting/changing of either one of the first and second threshold values alone.

Further, in this embodiment, the first threshold value (T1) and the second threshold value (T2) are set. Instead, for example, it is also possible to configure such that only the first threshold value (T1) is set, and when the slip ratio (Sr) exceeds the first threshold value (T1), the control information changing means 35 changes the control information G.

In the one operation wherein the control information changing means 35 changes the control information G (step #11), in place of the control information G1 which was set already during the draft control, there is newly set control information G2 which is shifted upward therefrom by an amount corresponding to the position lever component (Pc) (shown upward of the control information G1 in FIG. 5). The control information G2 thus set indicates a higher value of lift arm angle (a target machine body level) relative to a same draft load value W (this mode corresponds to a first mode of changing the control information by the control information changing means 35).

With the control information G is changed by the above-described upward shifting (the side corresponding to a shallower target plowing depth), even when no change occurs in the draft load value W, the lift arm angle (the target machine body level) obtained by making reference to the changed control information G2 with the draft load value W will be changed to the upward side (shallower side) as indicated by Vs in FIG. 5. That is, a control operation will be executed for elevating the plow P based on the changed control information G2, despite the draft load value W remaining the same value. During the elevation control, the plow P is elevated to the machine body level (Vs) determined as the target machine body level V (the target plowing depth). Therefore, there will occur no excessive elevation of the plow P and the draft load will be alleviated to solve slip of the wheels, and the plowing operation can be continued. In particular, the greater the value of the slip ratio (Sr) (the greater the amount of slip), the greater value will be set for the position lever component (Pc). So that, the upward shifting amount of the changed control information G2 will be increased, and even if the draft load value W remains the same, the target machine body level will be displaced to a higher (shallow) value, whereby the elevation amount of the plow P will be increased for realizing reliable alleviation of the draft load.

According to a further mode of processing of the control information changing means 35 changing the control information, there is effected a control wherein based on the gradient of the control information G1 already set during the draft control (set by the draft ratio setting dial 26), a change to a steeper gradient is effected by an angle corresponding to the position lever component (Pc) with priority over the setting by the draft ratio setting dial 26 (this mode corresponds to a second mode of changing the control information by the control information changing means 35).

If the control information G changed as above is represented by control information GH shown in FIG. 5 for example, with change of the sensitivity to higher sensitivity, the lift arm angle (the target machine body level) will be changed to the upward side, in response to a small change in the draft load value W. Therefore, even with a small increase in the draft load value W, the elevation control of the plow P will be effected. Also, with the change of the control sensitivity to the higher sensitivity, the target machine level V (the target plowing depth) too is set higher. Hence, the plow P will be elevated largely to the target machine body level V (target plowing depth). In this elevation control too, the draft load can be alleviated for solving wheel slip for allowing continuation of the plowing operation, without inviting any excessive elevation of the plow P.

Further, during the control of changing the control information G, in both the first mode and the second mode, the control for temporarily eliminating the insensitivity range or narrowing the insensitivity range may be effected as well. With such change of the insensitivity range, there is realized a control for elevating the plow in even more favorable manner.

With continuous and repeated execution of the control from the above steps #01 to #11 by short intervals, when wheel slip occurs in the course of the draft control, the control information G is changed to switch over the criteria for this control, the draft load can be alleviated without significantly changing the plowing depth.

[Functions/Effects of the Embodiment]

With the above-described construction, when the draft control is to be initiated, by lowering the plow P to a desired target plowing depth by an operation on the position lever 24, there is set control information G corresponding to this plowing depth (target underground machine body level). And, a target machine body level is set by making reference to the control information G thus set with the draft load value, so that it is possible to shift to a draft control for maintaining the level of the plow P to this target machine body level. And, during the draft control, reference is made to the control information G with the draft load value W to obtain a lift arm angle value (a target machine body level) and elevation of the plow P will be effected by a control similar to the position control, so that there occurs no excessive elevation or lowering of the plow P. Further, adjustment of the control sensitivity of the draft control is made possible by an operation on the draft ratio setting dial 26. And, with this adjustment of the sensitivity, there is made possible a draft control for significantly elevating/lowering the plow P in response to even a small change in the draft load value W.

In the course of the execution of such a draft control as above, if the wheel slip ratio (Sr) is found to exceed the first threshold value (T1) and this condition of exceeding continues for a period beyond the second threshold value (T2) (the set period), the control information G is changed based on the position lever component (Pc) obtained by calculation, whereby the plow P is elevated to reduce the draft load and solve the slip, thus allowing continuation of the plowing operation. In particular, in the first mode of changing the control information, the control information G is changed to be shifted upward (shallower target plowing depth). Hence, no excessive elevation of the plow P will occur, and it is possible to overcome the inconvenience of the plowing depth of the plow P being set too shallow. In the second mode of changing the control information, on the other hand, the control sensitivity is enhanced by changing the gradient of the control information G, so it becomes possible to elevate the plow P sensitively by a fixed amount.

As the traveling speed of the traveling machine body A is determined by reception by the GPS receiver 39 of microwave signals from a GPS satellite, it is possible to obtain the traveling speed of the traveling machine body A relatively easily with using an instrument which is commercially available as a navigation system, and the detection of the slip ratio too can be carried out easily.

Modified Embodiments

In addition to the embodiment described above, the present invention may be embodied as follows.

(a) In place of the GPS receiver 39 as a device for detecting the actual traveling speed of the traveling machine body A, there may be provided a camera for photographing the ground surface, the view of surrounding or the like. And, there may be provided an apparatus for determining the actual traveling speed of the traveling machine body A by providing a device for detecting a movement amount of the traveling machine body A from a difference of image data continuously captured by this camera by a predetermined interval. With this arrangement, it becomes possible to determine the actual traveling speed of the traveling machine body A with high accuracy.

(b) In place of the GPS receiver 39 as a device for detecting the actual traveling speed of the traveling machine body A, there may be provided a simple rolling wheel which comes into contact with the ground surface to be rotated thereby. And, a device may be provided for detecting the actual traveling speed of the traveling machine body A from the rotational amount of this rolling wheel. With this arrangement, it becomes possible to determine the actual traveling speed of the traveling machine body A.

(c) A special threshold value greater than the first threshold value may be provided. Then, when the slip ratio exceeds this special threshold value, there is set control information (the left side/upper side control information G) corresponding to a shallower plowing depth and simultaneously, the control sensitivity of the control information G may be enhanced. With such changing of the control information G as well as enhancement of the control sensitivity, when the slip ratio exceeds the special threshold value, the control operation for elevating the plow P can be effected even more favorably.

(d) In the foregoing, there was described an example in which the plow P is connected as a ground work implement, to the rear portion of the traveling machine body A. Instead of this, for example, any other ground work implement, such as a subsoiler, may be connected to the rear portion of the traveling machine body A.

INDUSTRIAL APPLICABILITY

The present invention may be applied to tractors in general, which effect a draft control of a ground work implement.

What is claimed is:

1. A tractor including a ground work implement liftably mounted to a traveling machine body which is caused to travel with a traveling apparatus, the tractor comprising:
   a draft load sensor for detecting a draft load value during a work by the ground work implement;
   means for changing control information, the means for changing control information setting, as predetermined control information, one of a plurality of control information based on the draft load value detected by the draft load sensor to obtain a target machine body value;
   means for controlling draft by executing lifting up/down control of the ground work implement so as to achieve agreement between the target machine body level value obtained by using the predetermined control information which is set based on the draft load value detected by the draft load sensor, and a machine body level value detected by a level sensor; and
   means for acquiring a slip ratio of the traveling apparatus relative to the ground surface;
   wherein when the slip ratio acquired by the means for acquiring the slip ratio exceeds a threshold value,
   (i) said means for changing the control information newly sets, as the predetermined control information, control information which obtains a higher target machine body value relative to a same draft load value, in place of the predetermined control information which has been already used during the draft control, or
   (ii) said means for changing the control information newly sets, as the predetermined control information, control information which obtains a value which renders an amount of change of the target machine body level value greater than an amount of change of the draft load value, in place of the predetermined control information which has been already used during the draft control.

2. A tractor according to claim 1, further comprising:
means for controlling position by executing the lifting up/down control of the ground work implement so as to achieve agreement between a set value of a position setter for setting a machine body level of the ground work implement and a machine body level value detected by a lift arm sensor for detecting the machine body level of the ground work implement; and
means for setting the control information based on the set value of the position setter when the ground work implement is set to a target underground machine level by a manual operation of the position setter, during the draft control.

3. A tractor according to claim 2, wherein
the control information has a data structure capable of displaying relationship between the draft load value and the machine body level value as linear information;
there is provided a sensitivity setting controller for manually changing gradient of the control information set by the means for setting the control information; and
when the control sensitivity of the control information is to be enhanced by the control information changing means, the gradient of the control information is set to a higher sensitivity side, in place of the setting by the sensitivity setting controller.

4. A tractor according to claim 1, wherein
the means for acquiring the slip ratio effects an operation of acquiring the slip ratio by comparing an actual traveling speed of the traveling machine body detected by continuous reception of signals from a GPS satellite and a driving speed based on the driving speed of the traveling apparatus.

* * * * *